3,149,158
PROCESS FOR THE PRODUCTION OF OXIMES
Walter Müller, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Feb. 13, 1962, Ser. No. 172,858
Claims priority, application Germany Feb. 27, 1961
7 Claims. (Cl. 260—566)

The present invention pertains to a process for the production of oximes of aldehydes and ketones from nitroalkanes and nitrocycloalkanes.

Oximes of aldehydes and ketones have heretofore been produced by the partial reduction of alkali-metal salts of nitroparaffins with reducing agents such as nascent hydrogen, stannous chloride, sodium dithionite ($Na_2S_2O_4$), hydrogen sulfide, and alkali-metal thiosulphates and dithionates. In these processes, the yield of oxime is either not satisfactory or the oxime can be separated from the reaction mixture only with difficulty. When sulfur-containing reducing agents are used, the resulting oxime also usually contains sulfur. Furthermore, in certain of these processes large amounts of valueless salts are also formed.

The principal object of the present invention is to provide technically advantageous process for the production of oximes from salts of nitroalkanes and nitrocycloalkanes and the free acidic aci-nitroalkanes and aci-nitrocycloalkanes that are liberated when aqueous solutions of such salts of nitroalkanes and nitrocycloalkanes are acidified.

The process of the present invention consists essentially in reacting such aci-nitroalkanes and aci-nitrocycloalkanes or their salts with about equimolar amounts of inorganic or organic acid halides in the presence of at least equimolar amounts of sulfur dioxide, preferably liquid sulfur dioxide, and with or without the addition of an inert solvent, and the reaction products, preferably after evaporation of the excess sulphur dioxide or of the solvent, treated with water.

The process of the present invention probably proceeds in accordance with the following equation:

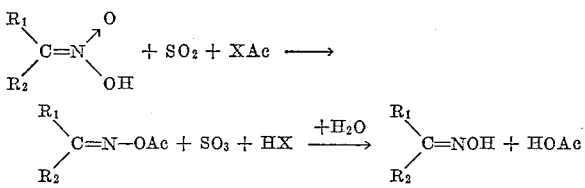

In the foregoing equation, $R_1$ and $R_2$ are each an alkyl radical or together are a cycloalkane ring, X is a halogen atom and Ac is an inorganic radical of an acid of sulfur or phosphorus, as hereinafter further specified, or an organic acyl radical. Although the equation represents the reaction of the free aci-nitroalkane and aci-nitrocycloalkane, it is to be understood that the "H" of the starting nitro compound may be replaced by an ammonium or alkali-metal or alkaline-earth-metal radical to represent the probable reaction when a salt of the nitroalkane or nitrocycloalkane, as illustrated in the examples which follow hereinafter, is used as the starting nitro compound.

The oximes produced in accordance with the process of the present invention are obtained in good yields and in a remarkably high state of purity.

Nitro compounds which may be converted to oximes in accordance with the process of the present invention include, in principle, all primary and secondary nitroalkanes and nitrocycloalkanes, such as nitromethane, nitroethane, 1 and 2-nitropropanes, 1 and 2-nitrobutanes and so on, phenylnitromethane, furthermore nitrocyclopentane, nitrocyclo hexane, nitrocyclododecane and substituted nitrocyclohexanes such as 3-nitro-1-methyl-cyclohexane.

These nitro compounds are used in the form of their salts, for example, their salts with ammonia and alkali and alkaline earth metals. In the case of nitro compounds whose tautomeric aci forms are comparatively stable, such as nitrocyclododecane, the aci form can be produced by the action of an acid on their salts and they may be used as such in the process of this invention.

Acid halides which may be reacted with these nitro compounds to produce oximes in accordance with the process of this invention include, for example, phosphorus trichloride, phosphorus oxychloride, phosphorus pentachloride, thionyl chloride, sulfuryl chloride, phosgene, acetyl chloride, propionyl chloride, benzoyl chloride and the homologous bromine compounds corresponding thereto.

The salt of the nitro compound or the nitro compound in its aci form is advantageously introduced, with stirring, into a mixture of the acid chloride in liquid sulfur dioxide at temperatures below about $+10°$ C., preferably below $0°$ C., at atmospheric pressure, or, for instance, up to about $+30°$ C., under a correspondingly higher pressure. If desired, instead of liquid sulfur dioxide, a solution of sulfur dioxide in an inert solvent, such as acetone or carbon tetrachloride, can also be used. If desired, the excess sulfur dioxide and the solvent are then evaporated and the residue mixed with a little water. The oxime thereby precipitates out, after neutralization, if necessary. As a rule, the oxime can be further used without purification, for example, it can be converted into a lactam, which, as known, are useful intermediates for the production of plastics.

The following examples are given for the purpose of illustrating the present invention. The quantities referred to as parts are to be understood to refer to parts by weight.

*Example 1*

23.5 parts of the sodium salt of nitrocylododecane are introduced portionwise into a solution of 11.9 parts of thionyl chloride in 64 parts of sulfur dioxide at $-20°$ to $-40°$ C. The excess sulfur dioxide is then allowed to evaporate and the residue mixed with a little water. The precipitated oxime of cyclododecanone is filtered off with suction. Yield: 18.9 parts (96% of the theory). Melting point 128–131° C. When recrystallized from petroleum ether or cyclohexane, the oxime has a melting point of 131° C.

*Example 2*

The procedure of Example 1 is repeated but, instead of thionyl chloride, 20.8 parts of phosphorus pentachloride is used. Crude product: 15.8 parts; melting point 120–125° C.

*Example 3*

The procedure of Example 1 is repeated but, instead of thionyl chloride, 13.4 parts of sulfuryl chloride is used. Crude product 15.8 parts; melting point 119–126° C.

*Example 4*

The procedure of Example 1 is repeated but, instead of thionyl chloride, 9.9 parts phosgene is used. Crude product: 17.5 parts; melting point 119–125° C.

*Example 5*

23.5 parts of the sodium salt of nitrocyclododecane are introduced at $-40°$ C. into a solution of 7.9 parts of acetyl chloride in 64 parts of sulfur dioxide. After the evaporation of the sulfur dioxide and addition of water to the residue, 15.4 parts of the oxime of cyclododecanone are obtained. Melting point 118–124° C.

Example 6

23.5 parts of the sodium salt of nitrocyclododecane are introduced portionwise at −20° to −40° C. into a solution of 11.9 parts of thionyl chloride in 79 parts of acetone and 64 parts of sulfur dioxide. At the termination of the reaction, the solvent is allowed to evaporate, water added to the residue and 16.3 parts of the oxime of cyclododecanone isolated. Melting point 116–120° C.

Example 7

72 parts of sulfur dioxide and 23.8 parts of thionyl chloride are dissolved in 320 parts carbon tetrachloride. 30.4 parts of the sodium salt of nitrocyclohexane are added thereto at −20° C. and within 60 minutes. After evaporating the sulfur dioxide and distilling off the carbon tetrachloride, the residue is mixed with a little water. After extraction with ether, 12 parts of nitrocyclohexane are recovered. After neutralization with dilute ammonia, 9.5 parts of the oxime of cyclohexanone are obtained (79% of the theory, calculated on the nitrocyclohexane consumed).

We claim:

1. A process for the production of oximes of aldehydes and ketones which comprises reacting together
    (i) a nitro compound of the group consisting of the ammonium, alkali-metal, and alkaline-earth-metal salts of primary and secondary nitroalkanes, nitrocycloalkanes, and aci-nitroalkanes and aci-nitrocycloalkanes that are liberated on acidification of aqueous solutions of such salts, together with
    (ii) an approximately stoichiometrical equivalent amount of an acid halide of the group consisting of phosphorus trichloride, phosphorus oxychloride, phosphorus pentachloride, thionyl chloride, sulfuryl chloride, phosgene, acetyl chloride, propionyl chloride, benzoyl chloride, phosphorus tribromide, phosphorus oxybromide, phosphorus pentabromide, thionyl bromide, sulfuryl bromide, carbonyl bromide, acetyl bromide, propionyl bromide, and benzoyl bromide, and
    (iii) at least a stoichiometrically equivalent proportion of sulfur dioxide at a temperature below about 30° C., and subsequently recovering oximes of aldehydes and ketones from the reaction mixture.

2. A process as defined in claim 1 in which a stoichiometric excess of liquid sulfur dioxide is used.

3. A process as defined in claim 1 in which the sulfur dioxide is used in the form of a solution in an inert solvent.

4. A process as defined in claim 1 in which the reaction is carried out in an inert solvent.

5. A process as defined in claim 1 in which the reaction of the nitro compound, the acid halide and the sulfur dioxide is carried out at a temperature below about +10° C.

6. A process for the production of the oxime of cyclododecanone which comprises reacting together, at a temperature between −20° and −40° C., the soduim salt of nitrocyclododecane, thionyl chloride, and sulfur dioxide, treating the reaction mixture with water and recovering the precipitated oxime of cylclododecanone from the resulting suspension.

7. A process for the production of the oxime of cyclohexanone which comprises reacting together, at a temperature of approximately −20° C., the sodium salt of nitrocyclohexane and a solution of thionyl chloride and sulfur dioxide in carbon tetrachloride, treating the reaction mixture with water, and recovering the precipitated oxime of cyclohexanone from the resulting suspension.

No references cited.